(12) United States Patent
Bouazizi et al.

(10) Patent No.: US 11,405,699 B2
(45) Date of Patent: Aug. 2, 2022

(54) USING GLTF2 EXTENSIONS TO SUPPORT VIDEO AND AUDIO DATA

(71) Applicant: QUALCOMM Incorporated, San Diego, CA (US)

(72) Inventors: Imed Bouazizi, Frisco, TX (US); Thomas Stockhammer, Bergen (DE); Nils Günther Peters, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/038,754

(22) Filed: Sep. 30, 2020

(65) Prior Publication Data

US 2021/0099773 A1 Apr. 1, 2021

Related U.S. Application Data

(60) Provisional application No. 62/909,095, filed on Oct. 1, 2019.

(51) Int. Cl.
| | |
|---|---|
| *H04N 21/236* | (2011.01) |
| *H04N 21/434* | (2011.01) |
| *H04N 21/81* | (2011.01) |
| *H04N 21/854* | (2011.01) |
| *H04N 21/8543* | (2011.01) |
| *H04N 21/8547* | (2011.01) |
| *H04N 21/845* | (2011.01) |
| *H04N 21/4402* | (2011.01) |

(Continued)

(52) U.S. Cl.
CPC ..... *H04N 21/8456* (2013.01); *H04N 21/2368* (2013.01); *H04N 21/440218* (2013.01); *H04N 21/8586* (2013.01)

(58) Field of Classification Search
None
See application file for complete search history.

(56) References Cited

U.S. PATENT DOCUMENTS 8,860,781 B2 * 10/2014 Nagaraj ................. H04N 19/44
348/42
9,161,006 B1 * 10/2015 Wang ........................ G06T 1/60
(Continued)

OTHER PUBLICATIONS

Bouazizi I., "Requirements on Integration of Scene Description in MPEG-I", Coding of Moving Pictures and Audio, ISO/IEC JTC1/SC29/WG11, N18339, Geneva, CH, Mar. 2019, XP30222339A, 15 pages.

(Continued)

*Primary Examiner* — Hsiungfei Peng
(74) *Attorney, Agent, or Firm* — Campbell C. Chiang

(57) ABSTRACT

An example device for accessing media data includes a memory configured to store media data; and one or more processors implemented in circuitry and configured to: receive a scene description of a GL Transmission Format 2.0 (glTF2) bitstream including a timed media object; determine a position of the timed media object in a presentation environment using the scene description; retrieve current timed media data for the timed media object for a current presentation time; and present the current timed media data according to the position of the timed media object at the current presentation time.

30 Claims, 8 Drawing Sheets

(51) Int. Cl.
*H04N 21/858* (2011.01)
*H04N 21/2368* (2011.01)

(56) References Cited

U.S. PATENT DOCUMENTS

| | | | | |
|---|---|---|---|---|
| 2007/0192818 | A1* | 8/2007 | Bourges-Sevenier | H04N 21/6125 725/132 |
| 2009/0037806 | A1* | 2/2009 | Yang | H04L 67/34 715/234 |
| 2019/0028691 | A1* | 1/2019 | Hinds | H04N 21/4518 |
| 2019/0114830 | A1 | 4/2019 | Bouazizi et al. | |
| 2021/0064391 | A1* | 3/2021 | Nguyen | G06F 9/44521 |
| 2021/0209855 | A1* | 7/2021 | Stokking | H04S 7/303 |

OTHER PUBLICATIONS

Bouazizi I., "Usage Scenarios Analysis for Scene Description", Coding of Moving Pictures and Audio, ISO/IEC JTC1/SC29/WG11 MPEG2017/m46349, Marrakech, MO, Jan. 2019, XP30214968A, 5 pages.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

Felding R., et al., "Hypertext Transfer Protocol—HTTP/1.1", Network Working Group, Request for Comments, RFC 2616, Standards Track, Jun. 1999, pp. 1-114.

International Search Report and Written Opinion—PCT/US2020/053793—ISA/EPO—dated Nov. 27, 2020.

ISO/IEC, "Text of ISO/IEC CD 23090-14 Scene Description for MPEG Media", ISO/IEC JTC 1/SC 29/WG 3, N00026, Nov. 30, 2020, 45 Pages, https://isotc.iso.org/livelink/livelink/open/jtc1sc29wg3.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Khronos, "gITF Overview—The Khronos Group Inc", Dec. 3, 2020, pp. 1-8, https://www.khronos.org/gItf/.

Paila T., et al., "FLUTE—File Delivery Over Unidirectional Transport", FLUTE—File Delivery over Unidirectional Transport, rfc6726. txt, Internet Engineering Task Force (IETF), Standard Track, Internet Society (ISOC) 4, Rue Des Falaises CH—1205 Geneva, Switzerland, Nov. 6, 2012 (Nov. 6, 2012), XP015086468, pp. 1-46, http://tools.ietf.org/html/rfc6726, [retrieved on Nov. 6, 2012], p. 3, line 30-p. 27, line 12.

QUALCOMM Incorporated (Rapporteur): "FS_XR5G: Editor's Proposed Updates to Permanent Document, v0.3.5", S4-190329, 3GPP TSG-SA4 Meeting 103, Newport Beach, CA, United States, Apr. 8-12, 2019, XP51722044A, 85 Pages.

"Text of ISO/IEC FDIS 23009-1:2014 4th Edition", ISO/IEC JTC 1/SC 29/WG 11, N18609, Aug. 9, 2019 (Aug. 9, 2019), 389 Pages, Retrieved from the Internet: https://isotc.iso.org/livelink/livelink/open/jtdsc29wg11.

* cited by examiner

USING GLTF2 EXTENSIONS TO SUPPORT VIDEO AND AUDIO DATA

This application claims the benefit of U.S. Provisional Application No. 62/909,095, filed Oct. 1, 2019, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for extending GL Transmission Format 2.0 (glTF2)to be used to support audio and video, among other technologies. In general, glTF2 is used to describe a static scene, that is, a scene in which presented media data is unchanging. The scene data may describe a presentation environment, i.e., a three-dimensional space that a user can navigate, e.g., using a virtual reality (VR) headset or computing device. According to the techniques of this disclosure, glTF2 may be modified to describe timed (e.g., dynamic) media objects, such as audio and video data. For example, a glTF2 scene according to these techniques may describe a position of a screen in the three-dimensional space for displaying a video or a position of a speaker in the three-dimensional space for playing audio data. In this manner, a device can present current timed media data in the correct position, such that a user can view/hear the media as if the media were being presented from the corresponding position in the three-dimensional space.

In one example, a device for accessing media data, the device comprising: a memory configured to store media data; and one or more processors implemented in circuitry and configured to: receive a scene description of a GL Transmission Format 2.0 (glTF2) bitstream including a timed media object; determine a position of the timed media object in a presentation environment using the scene description; retrieve current timed media data for the timed media object for a current presentation time; and present the current timed media data according to the position of the timed media object at the current presentation time.

In another example, a computer-readable storage medium has stored thereon instructions that, when executed, cause a processor to receive a scene description of a GL Transmission Format 2.0 (glTF2) bitstream including a timed media object; determine a position of the timed media object in a presentation environment using the scene description; retrieve current timed media data for the timed media object for a current presentation time; and present the current timed media data according to the position of the timed media object at the current presentation time.

In another example, a device for accessing media data comprises means for receiving a scene description of a GL Transmission Format 2.0 (glTF2) bitstream including a timed media object; means for determining a position of the timed media object in a presentation environment using the scene description; means for retrieving current timed media data for the timed media object for a current presentation time; and means for presenting the current timed media data according to the position of the timed media object at the current presentation time.

The details of one or more examples are set forth in the accompanying drawings and the description below. Other features, objects, and advantages will be apparent from the description and drawings, and from the claims.

DETAILED DESCRIPTION

Figure 1:
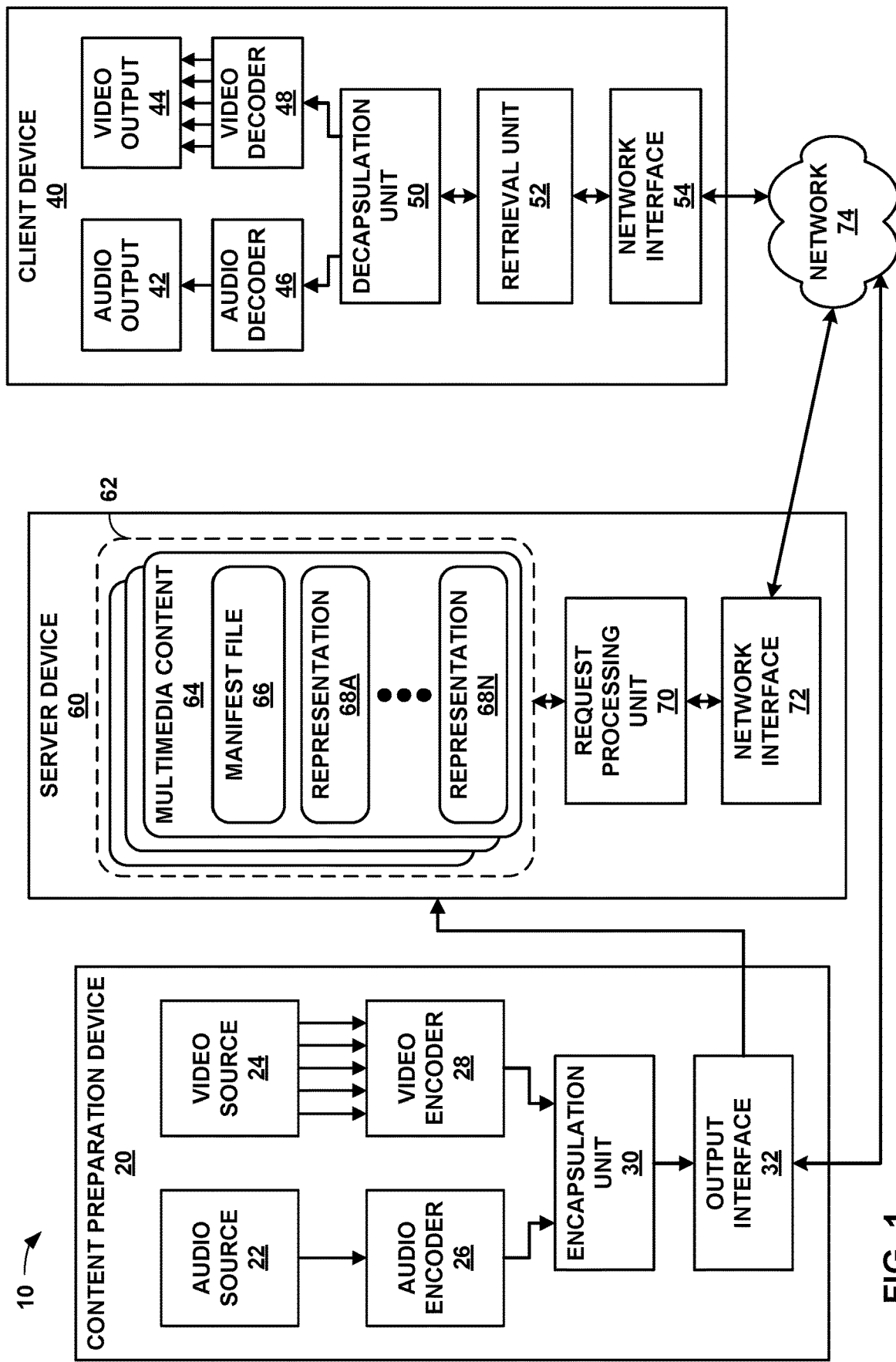
FIG. 1 is a block diagram illustrating an example system that implements techniques for streaming media data over a network.

GL Transmission Format 2.0 (glTF2) has been identified as a scene description candidate format to address needs of MPEG-I (Moving Pictures Experts Group—Immersive) and 6DoF (Six Degrees of Freedom) applications. glTF2 is described in, e.g., Khronos Group, The GL Transmission Format (glTF), version 2.0, github.com/KhronosGroup/glTF/tree/master/specification/2.0#specifying-extensions. However, this disclosure analyzes several features that may be missing from conventional glTF2 and techniques by which glTF2 may be improved to provide these missing features.

In general, glTF2 is used to describe static scenes. That is, media data presented using glTF2 is fixed and unchanging. Using the techniques of this disclosure, glTF2 can be used to describe a scene including dynamic media data, such as audio and video data. For example, a three-dimensional rendered scene may include an object, such as a display screen or other object, that presents video data. Likewise, the three-dimensional rendered scene may include an audio object positioned at a speaker in the three-dimensional rendered scene.

The techniques of this disclosure may address various requirements for supporting timed media data using glTF2. One requirement is that the scene description shall support audio, video and other media formats standardized by MPEG. Conventional glTF2 conventionally has no support for audio or video media formats. However, conventional glTF2 supports several still image formats.

Another requirement is that the scene description shall support definitions to indicate how sub-graphs and objects are related in terms of their temporal, spatial, and logical relationships. This requirement is partially supported in conventional glTF2, since with exception of animations, all nodes of a scene graph are assumed to be active at time 0, and there is no concept of scene updates in conventional glTF2.

Another requirement is that the scene description shall support synchronization between objects and attributes in the scene. In conventional glTF2, this is only supported through animations.

Another requirement is that the scene description shall support spatial and temporal random access. Conventional glTF2 does not support temporal random access into the scene, since there is no notion of a scene timeline or the ability to update and there is no inherent support for timed media in conventional glTF2.

Another requirement is that the scene description should support nodes and attributes in order to implement natural laws of acoustic energy propagation and physical kinematic operations. The support for acoustic characteristics of materials and nodes is non-existent in conventional glTF2.

Another requirement is that the scene description shall support parametric models for use in rendering environmental acoustic behavior (e.g. reverberation, occlusion and directivity). Conventional glTF2 has no support for audio in the scene.

Another requirement is that it should be possible to update the whole scene-graph, a sub-graph, or a node in the scene description. Conventional glTF2 does not come with a scene update mechanism.

Another requirement is that it should be possible to correctly render a 6DoF Presentation after a random access in time. Conventional glTF2 has neither support for a timing model nor scene updates through time and, as such, every glTF2 is considered a random access point in time.

Another requirement is that it should be possible to perform timed scene description updates. Conventional glTF2 does not come with a scene update mechanism.

Another requirement is that it should be possible to associate a scene description update with the corresponding scene description. Conventional glTF2 does not come with a scene update mechanism.

Another requirement is that it should be possible to access timed and non-timed, 2D and 3D media (meshes, point clouds, audio elements, . . . ), stored locally or over the network. Conventional glTF2 has support for buffers and images that fetch their content from a local file system or over the network. However, there is no support for timed media.

Another requirement is that it should be possible to retrieve media depending on the desired level of detail. Retrieving different levels of detail of geometry and texture is generally possible in conventional glTF2 through preprocessing the conventional glTF2 scene. These operations are not supported by the conventional glTF2 scene itself.

Another requirement is that it should be possible to retrieve and access referenced media partially in time and space. Conventional glTF2 references lack any attributes to indicate time or space points in the referenced media.

Another requirement is that audio elements should be rendered consistently with their corresponding visual elements, if such visual elements exist. Conventional glTF2 has no support for audio.

Another requirement is that audio elements should be rendered consistently with their corresponding visual elements, if such visual elements exist. Conventional glTF2 has no support for audio nodes.

Another requirement is that the specification should enable synchronization of audio and video of users and the scene. Conventional glTF2 has no support for audio from the scene or from the user.

Another requirement is that it should be possible to discover and configure local capture modalities. Conventional glTF2 itself has no support for local modalities, but OpenXR provides application programming interfaces (APIs) to do that.

Another requirement is that it should be possible to adjust the presentation based on local capture modality availability. Conventional glTF2 itself has no support for local modalities, but OpenXR provides APIs to do that.

Another requirement is that it should be possible to reference media objects that are captured locally using different capture modalities. Conventional glTF2 itself has no support for local modalities, but OpenXR provides APIs to do that.

Another requirement is that it should be possible to provide feedback through available actuators. Conventional glTF2 itself has no support for local modalities, but OpenXR provides APIs to do that.

In general, this disclosure describes techniques that may be used to extend glTF2 to achieve any or all of the various requirements of, e.g., MPEG-I and/or 6DoF as discussed above. Any or all of the techniques discussed in greater detail below may be applied alone or in any combination.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data.

The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Content preparation device 20 may prepare a GL Transmission Format 2.0 (glTF2) bitstream including one or more timed media objects, such as audio and video objects. In particular, content preparation device 20 (e.g., encapsulation unit 30 thereof) may prepare a glTF2 scene description for the glTF2 bitstream indicating the presence of a timed media object, a position of the timed media object in a presentation environment (e.g., a three-dimensional space navigable by a user in, e.g., virtual reality, a video game, or other rendered virtual environment). The timed media object may also be associated with a presentation time, such that client device 40 can present the timed media object at a current time for the timed media object. For example, content preparation device 20 may capture audio and video data live and stream the live-captured audio and video data to client device 40 in real time. The scene description data may indicate that the timed media object is stored on server device 60 or another remote device relative to client device 40, or that the timed media object is included in the glTF2 bitstream or otherwise already present on client device 40.

Thus, client device 40 may retrieve the glTF2 bitstream including the scene description including data describing the timed media object, such as a location from which the timed media object can be retrieved, a position of the timed media object in the presentation environment, and a presentation time for the timed media object. In this manner, client device 40 may retrieve current timed media data for the timed media object for a current presentation time and present the timed media data at the proper position in the presentation environment and at the current playback time.

Client device 40 may be configured to instantiate a circular buffer in a memory thereof (not shown in FIG. 1). Audio decoder 46 and video decoder 48 may store frames of audio or video data to the circular buffer, and audio output 42 and video output 44 may extract the frames from the circular buffer. For example, audio output 42, video output 44, audio decoder 46, and video decoder 48 may maintain read and write pointers into the circular buffer, where audio decoder 46 and video decoder 48 may store a decoded frame at the write pointer, then advance the write pointer, while audio output 42 and video output 44 may extract a decoded frame at the read pointer and then advance the read pointer. Moreover, client device 40 may prevent the read pointer from exceeding the write pointer, and the write pointer from overtaking the read pointer, to prevent buffer overflow and underflow.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
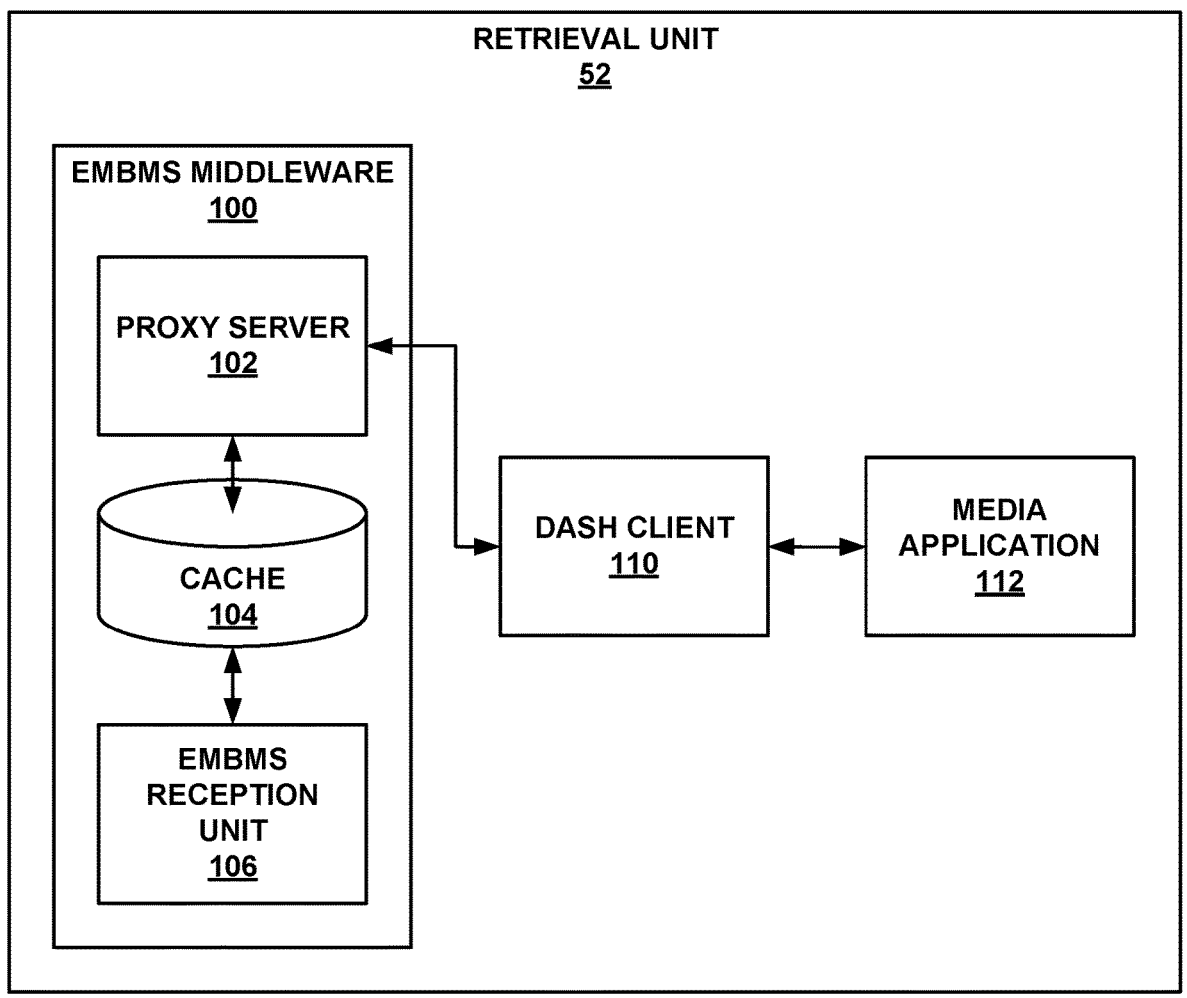
FIG. 2 is a block diagram illustrating an example set of components of a retrieval unit in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
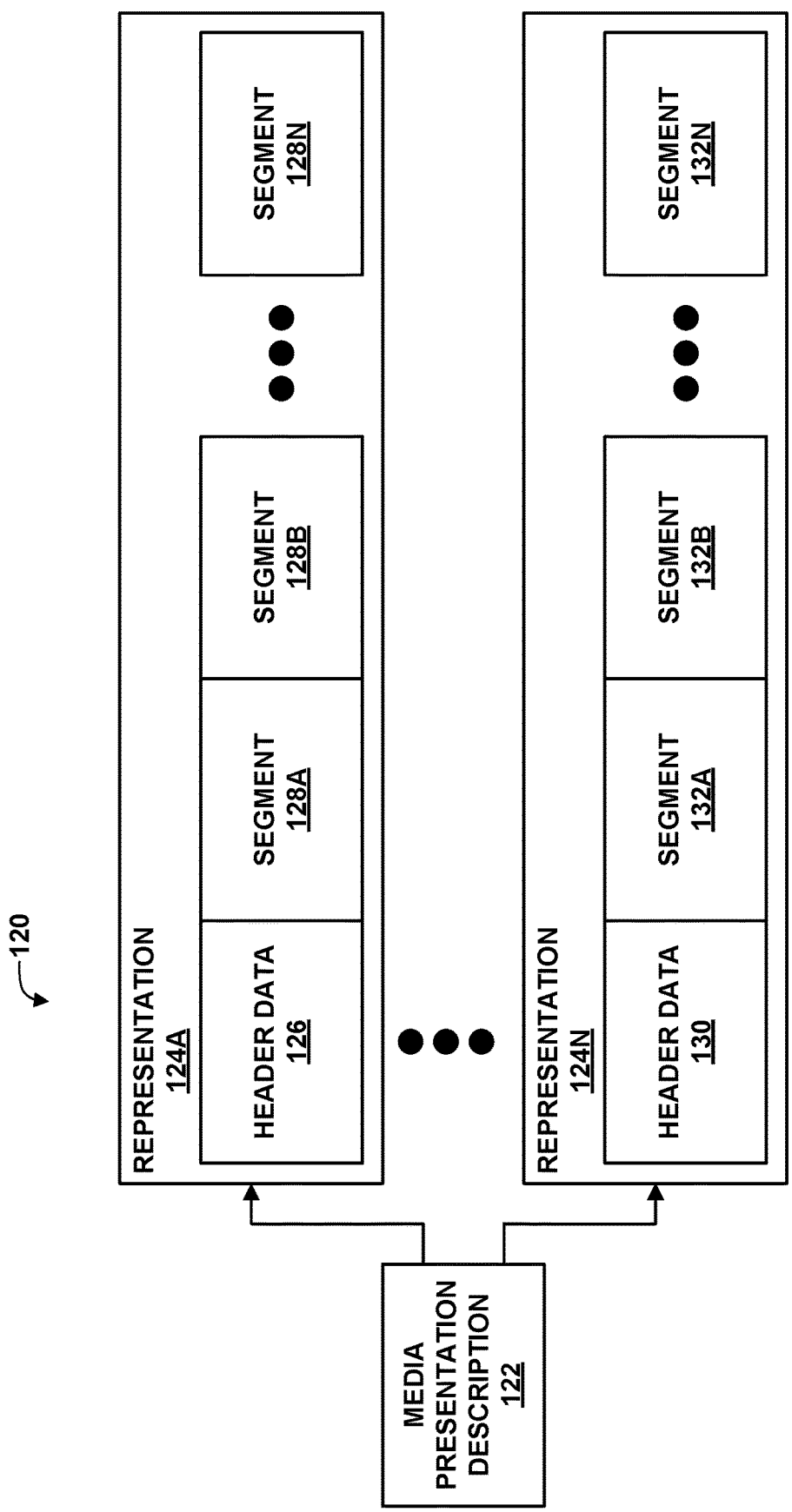
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
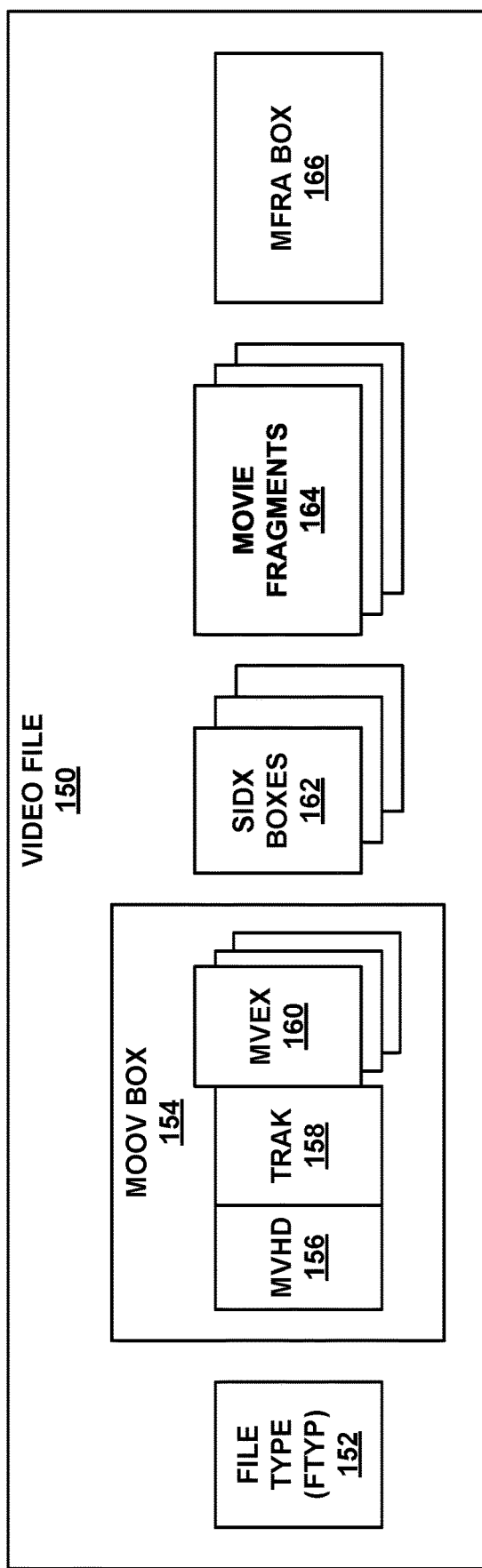
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Conventional glTF2 defines an extension mechanism ("Specifying Extensions") that allows the base format to be extended with new capabilities. Any glTF2 object can have an optional extensions property that lists the extensions that are used by that object. According to glTF2, all extensions that are used in a glTF2 scene must be listed in the top-level extensionsUsed array object. Likewise, according to glTF2, extensions that are required to correctly render the scene must also be listed in the extensionsRequired array.

In order to support video-based textures in glTF2, the techniques of this disclosure (e.g., performed by content preparation device 20, server device 60, and/or client device 40) may use a defined extension of glTF2 similar to the <video> element of HTML and the Media Source extensions thereof. In particular, these techniques include use of a texture element to define a new MotionPictureTexture object. This element may reference a new source type that will allow for accessing 2D video elements, either locally or remotely. The source should allow for decoding of the compressed 2D video, converting the output luminance and chrominance (YUV) to a texture format that is supported by the graphics processing unit (GPU), and making it available through a bufferView with the necessary synchronization information. The extension may be denoted "MPEG_texture_video," which may be included in the extensionsUsed and extensionsRequired of the asset as follows:

```
{
    "extensionsUsed": [
        "MPEG_texture_video"
    ]
}
{
    "extensionsRequired": [
        "MPEG_texture_video"
    ]
}
```

If a texture contains an extension property and the extension property defines its MPEG_texture_video property, then client device 40 may extract the texture from an MPEG compressed video stream. Likewise, server device 60 and/or content preparation device 20 may provide the MPEG_texture_video property and a bitstream including the texture. In such case, the source attribute need not be present.

Figure 5:
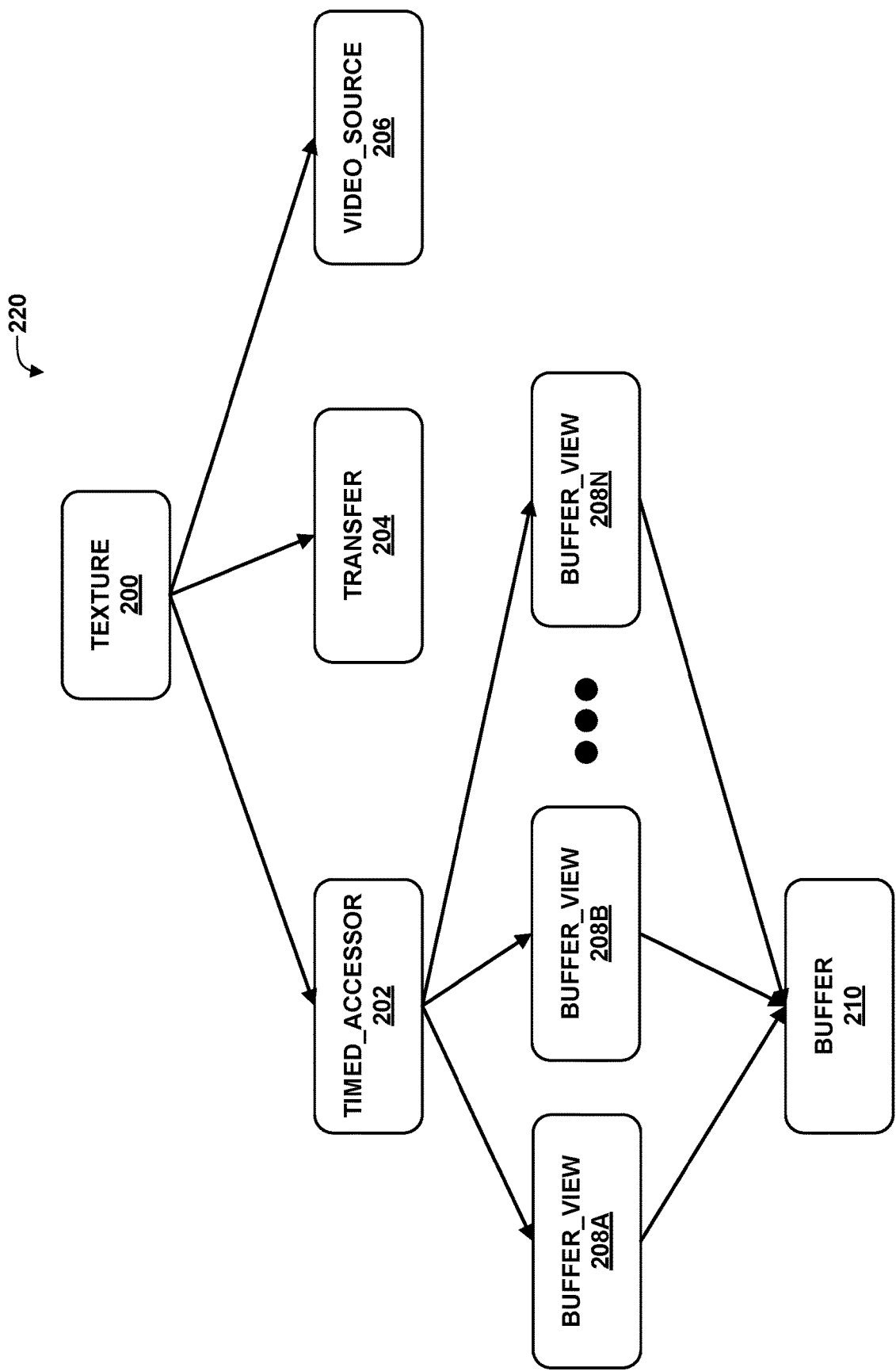
FIG. 5 is a conceptual diagram illustrating an example extended glTF2 schema according to techniques of this disclosure.

FIG. 5 is a conceptual diagram illustrating an example extended glTF2 schema 220 according to techniques of this disclosure. In this example, glTF2 schema 220 includes texture element 200, which includes timed accessor element 202, transfer element 204, and video_source element 206. Timed_accessor element 202 is a modification of a previous accessor that allows for rotating through a set of buffer_view elements 208A-208N (buffer_view elements 208), based on their timestamps, to access a corresponding texture.

Each of buffer_view elements 208 corresponds to buffer element 210, representing a buffer for storing frames of media data (e.g., audio or video data). The buffer may be operated as a circular buffer of a pre-defined number of texture frames, as discussed above and in greater detail below, e.g., with respect to FIG. 6. When a new texture frame is inserted into the circular buffer, client device 40 may replace a texture frame having an oldest timestamp with the new texture frame.

Each of buffer_view elements 208 may correspond to a texture frame. A texture frame may start with a VEC2 (2D vector) of UNSIGNED INT values. The first value may provide a 32-bit timestamp that corresponds to the presentation timestamp of the frame and the second value may provide a picture number.

Video_source element 206 may provide the necessary information to access the video source. This may include a URL (either to a local or to a remote video resource, e.g., a localhost address of client device 40 corresponding to data within cache 104 (FIG. 2) or an address corresponding to server device 60 or content preparation device 20 (FIG. 1)), a MIME type of the video resource or stream, and time access and mapping information, in a similar fashion as defined for the HTML-5 video element.

The source may be one of the following, in various examples:
A video source, indicated by the video MIME type and encapsulated into a timed track such as provided by an MP4/ISO BMFF track. The same may apply for an audio source.
A multiplexed source that contains, for example, a video track and an audio track.
A DASH Media Presentation indicated by a URL. The DASH Media Presentation may contain a single source object, but in multiple variants to permit selection (for example based on codecs or resolution) as well as for dynamic rate adaptation (typically different bitrates). This is represented by multiple Adaptation Sets and/or multiple Representations, respectively. In a similar session the object may point to an audio source. The source may be provided using Common Media Access Format (CMAF) following the DASH profile for CMAF content, as defined in ISO/IEC 23009-1 $4^{th}$ edition, WD of Amendment 1.
A DASH Media Presentation with multiple media types, for example, for a synchronized audio/video presentation. Again, content may conform to the DASH profile for CMAF content.

If the MIME type, for example, indicates a DASH streaming session, media retrieval may be done through a DASH player. The time access information may be used to provide an offset into the referenced video stream. The time mapping information may be used to establish a mapping between the internal timing of the media stream and the timeline that will be used in glTF2.

Client device 40 may amend the URL by adding a media fragment to the media URL to specify the exact portion to be played. To add a media fragment, client device 40 may simply add #t=[start_time][,end_time] to the media URL. The element may contain one or more of the following attributes to specify properties in the playback, for example, following the HTML-5 video element:
autoplay: Tells the player to immediately start play it as soon as it can.
poster: Provides an image to show before the video loads.
controls* Shows the default video controls (play, pause, etc.)
loop Tells the player to automatically loop the video.
muted Mutes the audio from the video.
The transfer node may be used to convert the decoded video output color space and spatial packing into a GPU-friendly color space format. The transfer function is provided as a GLSL function implementation that is called from the fragment shader to extract the correct texture coordinates. This operation may include scaling of the video decoder output into a power of 2 texture.

The following example demonstrates the extension discussed above:

```
{
    "textures": [
        {
            "timedAccessor": 0,
            "videoSource": 0,
            "transfer": {
                "uri": "transfer.glsl"
            }
        }
    ],
    "videoSources": [
        {
            "uri": "https://www.example.com/cotent/video.mpd",
            "mime": "application/dash+xml",
            "timeOffset": "0"
        }
    ],
    "timedAccessors": [
        {
            "bufferViews": [
```

-continued

```
            0,
            1,
            2
        ],
        "componentType": 5126,
        "byteOffset": 0,
        "count": 1,
        "type": "VEC2"
    },
    {
        "bufferViews": [
            0,
            1,
            2
        ],
        "componentType": 5126,
        "byteOffset": 8,
        "count": 1,
        "type": "VEC4"
    }
    ],
    "bufferViews": [
        {
            "buffer": 0,
            "byteLength": 33554440,
            "byteOffset": 0,
            "name": "texture_frame_0",
            "target": 34963
        },
        {
            "buffer": 0,
            "byteLength": 33554440,
            "byteOffset": 33554440,
            "name": "texture_frame_1",
            "target": 34963
        },
        {
            "buffer": 0,
            "byteLength": 33554440,
            "byteOffset": 67108880,
            "name": "texture_frame_2",
            "target": 34963
        }
    ],
    "buffers": [
        {
            "byteLength": 100663320
        }
    ]
}
```

The video element may permit interaction with the media that can be used in a dynamic fashion by the execution environment. Examples include the following, again resembling the HTML-5 video element:

| | |
|---|---|
| currentTime | Gets or sets the current playback position in seconds. |
| volume | Gets or sets the current volume level for the video. |
| muted | Gets or sets the mute state. |
| playbackRate | Gets or sets the playback rate, where 1 is normal speed forward. |

Controls and Events may be defined similar to video elements to pause, play, or get other notifications. Again, as an example, the HTML-5 video element procedures may serve as a starting point.

In an extension to the above video element, a media source API may be defined as an element to allow scripting in order to generate media streams for playback. This dynamic approach may allow generation of streams to facilitate a variety of use cases, like adaptive streaming and time shifting live streams without requiring a DASH player, and also permits additional flexibility in the playback. Such dynamic playback may also not only allow reaction to network conditions, but also may permit viewport dependent streaming approaches where objects are streamed based on the current viewport.

Figure 6:
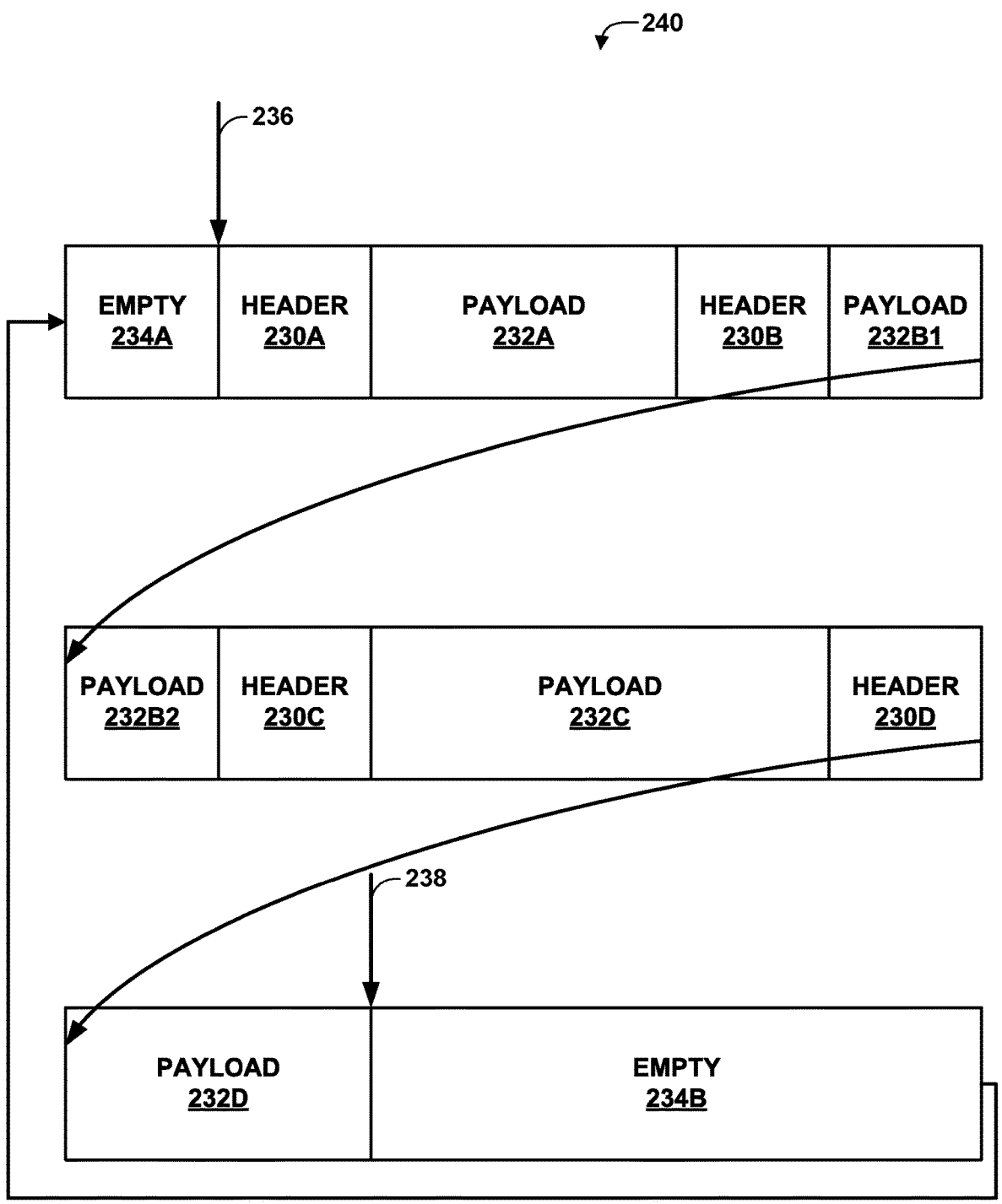
FIG. 6 is a conceptual diagram illustrating an example circular buffer according to the techniques of this disclosure.

FIG. 6 is a conceptual diagram illustrating an example circular buffer 240 according to the techniques of this disclosure. In this example, circular buffer 240 includes empty data 234A, 234B (which may correspond to portions of circular buffer 240 that do not include usable media data), as well as decoded media frames including respective headers 230A-230D and payloads 232A-232D. Although four frames are shown in this example, in general, circular buffer 240 may store any arbitrary number of frames, according to an amount of memory allocated to circular buffer 240 and a size of the frames.

Client device 40 may also maintain read pointer 236 and write pointer 238. In general, read pointer 236 identifies a starting point of a next media frame to be read (in this case, the frame including header 230A and payload 232A), while write pointer 238 represents a portion of circular buffer 240 at which a subsequent frame can be written. As discussed above, client device 40 may manage circular buffer 240 in such a manner that read pointer 236 does not pass write pointer 238, and also, to prevent write pointer 238 from overtaking read pointer 236, to avoid buffer overflow and underflow.

In this example, client device 40 may allocate memory for circular buffer 240 based on a number of frames to be stored, dimensions of each frame, and the sample format of every texel of the frame. Multiple frames may be used to swap the buffers and ensure smooth access to the buffer. An accessor of client device 40 may maintain both read pointer 236 and write pointer 238 as shown. The frames are read at read pointer 236 for rendering. New incoming frames from the media decoder are inserted at write pointer 238. Client device 40 may store values for read pointer 236 and write pointer 238 as offsets into the buffer.

The renderer of client device 40 may ensure that Timestamp(write_pointer)>Timestamp(read_pointer). When overwriting a frame in the buffer with a new decoded video frame, the renderer may ensure that the read_pointer is moved to the frame with the oldest timestamp. This may result in a frame drop, but will ensure that no concurrent access to the same frame in the buffer is performed.

Figure 7:
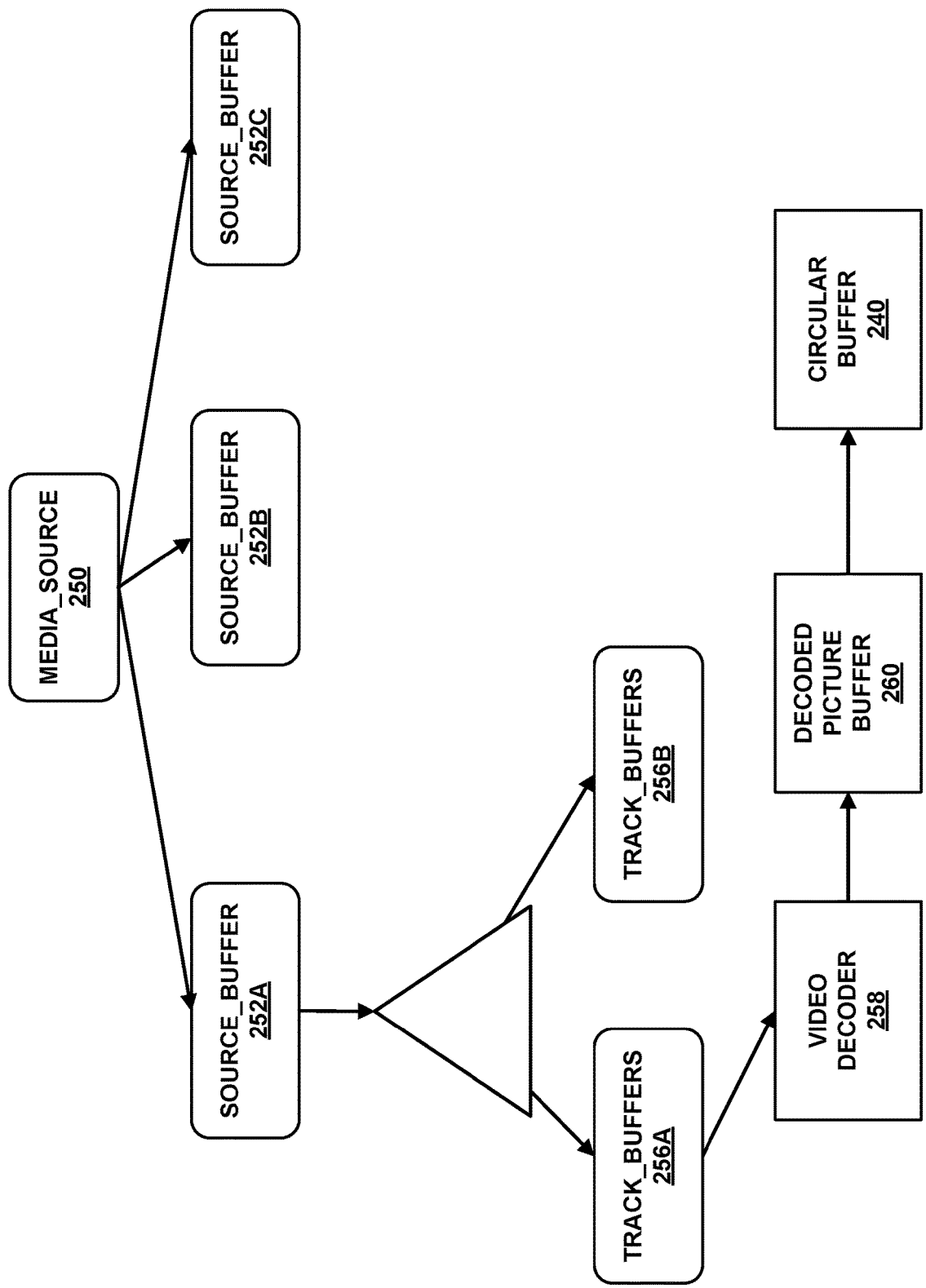
FIG. 7 is a conceptual diagram illustrating an example connection between a videoSource node (implemented as a decoded picture buffer) and a media source according to the techniques of this disclosure.

FIG. 7 is a conceptual diagram illustrating an example connection between a videoSource node (implemented as decoded picture buffer 280) and media_source element 250 according to the techniques of this disclosure. The videoSource node is implemented as a decoded picture buffer that is connected to a media source. The selection of the appropriate track(s) to decode to feed into the video texture buffer is left to the media application.

In the example of FIG. 7, media_source element 250 includes source_buffers 252A-252C (source_buffers 252). Data from source_buffers 252 can be extracted for multiple respective track buffers, such as track_buffers 256A, 256B (track_buffers 256). A media decoder, such as video decoder 258 (which may correspond to video decoder 48 of client device 40 of FIG. 1) may extract encoded media data from a track buffer corresponding to one of the track buffers, e.g., track_buffer 256A. Video decoder 258 may then decode the encoded media data and store decoded media data to decoded picture buffer 260. Decoded picture buffer 260, in turn, may output decoded video data to circular buffer 240. Decoded picture buffer 260 and circular buffer 240 may form part of one or more hardware memory devices of client device 40 of FIG. 1, such as random access memory (RAM).

MPEG is also defining a 6DoF audio encoder input format to address the MPEG-I requirements on 6DoF scene audio. Conventional glTF2 does not provide any support for audio scenes. To address this gap, this disclosure describes a new node type and new material extension, which may be used by content preparation device 20, server device 60, and client device 40, for example. When processing the glTF2 scene graph, client device 40 may perform an audio preparation step to convert the glTF2 scene into an audio encoder input format for audio. A new child node of material called "AcousticMaterial" may be defined. This new child element corresponds to the "AcousticMaterial" element in the audio encoder input format. Audio sources may be defined as child attribute nodes of Mesh primitives. Client device 40 may retrieve the audio content from local files (e.g., cache 104 of FIG. 2) or over the network (e.g., from content preparation device 20 and/or server device 60). Each audio source may describe the access to the stream that provides the audio data for that source. All audio-related elements may be scoped by the "MPEG_audio" extension namespace.

Similar to Javascript for HTML documents, client device 40 may support active processing in order to update a glTF2 scene description. This allows updates to the description object model in an asynchronous manner (based on events such as interactivity or server events) as well as in a synchronous manner with a media source. In the latter case, a model as defined for Web Resource Track model for which updates are timed using a ISO BMFF track format aligned with ISO/IEC 29001-15 may be defined.

Figure 8:
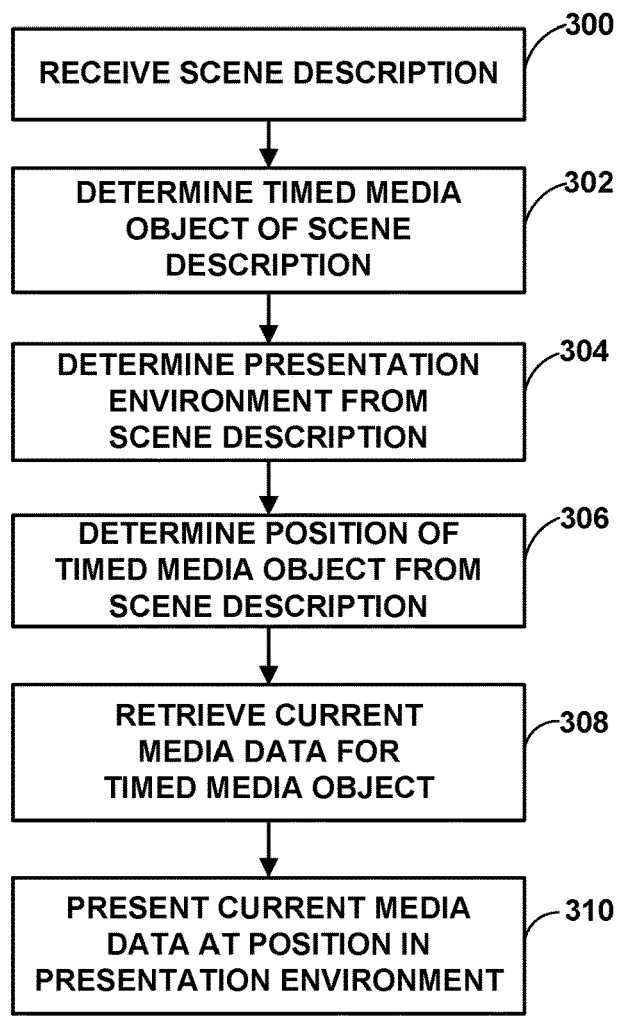
FIG. 8 is a flowchart illustrating an example method of accessing media data according to the techniques of this disclosure.

FIG. 8 is a flowchart illustrating an example method of accessing media data according to the techniques of this disclosure. The method of FIG. 8 is described with respect to the example of client device 40 of FIG. 1. However, other devices may be configured to perform these or other techniques of this disclosure.

Initially, client device 40 may receive a scene description (300) for a GL Transmission Format 2.0 (glTF2) bitstream. Client device 40 may process the scene description and determine a timed media object of the scene description (302). For example, the scene description may include data according to glTF2 schema 220 of FIG. 5, e.g., including a timed_accessor element describing multiple buffer_view elements, which may each correspond to respective media frames, such as audio or video frames.

Client device 40 may also determine a presentation environment from the scene description (304). For example, client device 40 may determine locations of virtual objects to be displayed in a three-dimensional space, such as walls, floors, ceilings, doors, and other objects, e.g., tables, chairs, and the like. Moreover, client device 40 may determine a position of the timed media object from the scene description (306) in the three-dimensional space of the presentation environment.

Client device 40 may then retrieve current media data for the timed media object (308). For example, client device 40 may have previously received the timed media data and cached the timed media data to cache 104 (FIG. 2). Alternatively, the timed media data may be available from a separate source, such as server device 60 (FIG. 1). Video_source element 206 (FIG. 5) may describe a source of the video data, such as a URL specifying a localhost address (to indicate client device 40) or an address of server device 60.

Client device 40 may then present the current media data at the indicated position of the presentation environment (310). For example, client device 40 may read encoded video data from cache 104, decode the encoded video data, write the decoded video data to a circular buffer, such as circular buffer 240, and retrieve previously decoded video data from the circular buffer for presentation. Client device 40 may then output the media data, e.g., via one of audio output 42 or video output 44.

In this manner, the method of FIG. 8 represents an example of a method that can be performed by client device 40, including receiving a scene description of a GL Transmission Format 2.0 (glTF2) bitstream including a timed media object; determining a position of the timed media object in a presentation environment using the scene description; retrieving current timed media data for the timed media object for a current presentation time; and presenting the current timed media data according to the position of the timed media object at the current presentation time.

The techniques of this disclosure, as performed by, e.g., content preparation device 20, server device 60, and/or client device 40 may address the various requirements discussed above. For example:

Regarding the requirement that the scene description shall support audio, video and other media formats standardized by MPEG: By the above extensions, glTF2 would support audio and video formats.

Regarding the requirement that the scene description shall support definitions to indicate how sub-graphs and objects are related in terms of their temporal, spatial, and logical relationships: By adding a scene update, glTF2 can fulfill this.

Regarding the requirement that the scene description shall support synchronization between objects and attributes in the scene: By applying the updates above using a timing model using the Web Resource track, synchronization is supported.

Regarding the requirement that the scene description shall support spatial and temporal random access: By the updates above, the scene can be accessed at a specific time.

Regarding the requirement that the scene description should support nodes and attributes in order to implement natural laws of acoustic energy propagation and physical kinematic operations: By the audio extensions above, this can be addressed.

Regarding the requirement that the scene description shall support parametric models for use in rendering environmental acoustic behavior (e.g. reverberation, occlusion and directivity): By the audio extensions above, this can be addressed.

Regarding the requirement that it should be possible to update the whole scene-graph, a sub-graph, or a node in the scene description: By adding scene updates as discussed above, this issue can be addressed.

Regarding the requirement that it should be possible to correctly render a 6DoF Presentation after a random access in time: By adding scene updates and a model as defined in the Web resource track and discussed above, such features are supported.

Regarding the requirement that it should be possible to perform timed scene description updates: By adding scene updates as discussed above, this issue can be addressed.

Regarding the requirement that it should be possible to associate a scene description update with the corresponding scene description: By adding scene updates as discussed above, this issue can be addressed.

Regarding the requirement that it should be possible to access timed and non-timed, 2D and 3D media (meshes, point clouds, audio elements, . . . ), stored locally or over the network: By the updates proposed above, this functionality is added.

Regarding the requirement that it should be possible to retrieve media depending on the desired level of detail: Streaming using dynamic loading of timed media supports this, as discussed above.

Regarding the requirement that it should be possible to retrieve and access referenced media partially in time and space: Streaming using dynamic loading of timed media supports this, as discussed above.

Regarding the requirement that audio elements should be rendered consistently with their corresponding visual elements, if such visual elements exist: By the audio extensions discussed above, this can be addressed.

Regarding the requirement that audio elements should be rendered consistently with their corresponding visual elements, if such visual elements exist: By the audio extensions discussed above, this can be addressed.

Regarding the requirement that the specification should enable synchronization of audio and video of users and the scene: By the audio extensions discussed above, this can be addressed.

Regarding the requirement that it should be possible to discover and configure local capture modalities: By using the baseline model discussed above, capability discovery can be achieved.

Regarding the requirement that it should be possible to adjust the presentation based on local capture modality availability: Conventional glTF2 itself has no support for local modalities, but OpenXR provides APIs to do that.

Regarding the requirement that it should be possible to reference media objects that are captured locally using different capture modalities. Conventional glTF2 itself has no support for local modalities, but OpenXR provides APIs to do that.

Regarding the requirement that it should be possible to provide feedback through available actuators. Conventional glTF2 itself has no support for local modalities, but OpenXR provides APIs to do that.

Certain techniques of this disclosure are summarized in the following examples:

Example 1: A method of accessing media data, the method comprising: receiving a texture element of a GL Transmission Format 2.0 (glTF2) bitstream referencing a video object; and accessing the video object using data of the texture element.

Example 2: The method of example 1, wherein the texture element indicates that the video object is stored on a remote device.

Example 3: The method of example 2, wherein the texture element defines a uniform resource locator (URL) of the video object.

Example 4: The method of example 1, wherein the texture element indicates that the video object is stored locally.

Example 5: The method of example 4, wherein the texture element defines a uniform resource locator (URL) of the video object.

Example 6: The method of any of examples 1-5, further comprising: decoding encoded video data of the video object to produce decoded YUV data; converting the decoded YUV data to a texture format supported by a local graphics processing unit (GPU); and making the texture formatted data available through a bufferView element with synchronization information.

Example 7: The method of any of examples 1-6, further comprising processing an MPEG_texture_video extension to glTF2 in an extensionsUsed element and an extensionsRequired element.

Example 8: The method of any of examples 1-7, further comprising storing texture frames of the video object to a circular buffer.

Example 9: The method of example 8, wherein each of the texture frames is associated with a bufferView element.

Example 10: The method of any of examples 8 and 9, wherein each of the texture frames starts with a corresponding 2D vector of unsigned integer values including a 32-bit timestamp that corresponds to a presentation timestamp of the texture frame and a picture number value of the texture frame.

Example 11: The method of any of examples 8-10, further comprising maintaining a read pointer into the circular buffer and a write pointer into the circular buffer, and preventing the read pointer from passing the write pointer.

Example 12: The method of any of examples 1-11, further comprising determining a URL of the video object, a MIME type of the video object, and time access and mapping information of the video object.

Example 13: The method of any of examples 1-12, wherein accessing comprises accessing the video object from a source.

Example 14: The method of example 13, wherein the source comprises at least one of a video source indicated by a video MIME type and encapsulated into a timed track, a multiplexed source containing a video track and an audio track, a DASH media presentation indicated by a URL, or a DASH media presentation with multiple media types.

Example 15: The method of any of examples 1-14, wherein accessing comprises accessing the video object using an HTTP GET request specifying a URL, the method further comprising appending at least one of an autoplay attribute, a poster attribute, a controls* attribute, a loop attribute, or a muted attribute to the URL in the HTTP GET request.

Example 16: The method of any of examples 1-15, further comprising converting data of the glTF2 bitstream to an audio encoder input format.

Example 17: The method of example 16, further comprising processing an AcousticMaterial element in the audio encoder input format.

Example 18: The method of any of examples 16 and 17, further comprising determining audio sources corresponding to child attribute nodes of mesh primitives.

Example 19: The method of any of examples 16-18, further comprising accessing encoded audio data of the gtlTF2.

Example 20: The method of example 19, wherein accessing the encoded audio data comprises retrieving the encoded audio data from a remote network device.

Example 21: The method of example 19, wherein accessing the encoded audio data comprises retrieving the encoded audio data from a local cache.

Example 22: The method of any of examples 1-21, further comprising updating a glTF2 scene description for the glTF2 bitstream using active processing.

Example 23: The method of example 22, further comprising updating a description object model in an asynchronous manner.

Example 24: The method of any of examples 22 and 23, further comprising updating the description object model in a synchronous manner with a media source.

Example 25: A device for accessing media data, the device comprising one or more means for performing the method of any of examples 1-24.

Example 26: The device of example 25, wherein the one or more means comprise a memory for storing media data and one or more processors implemented in circuitry.

Example 27: The device of example 25, wherein the device comprises at least one of: an integrated circuit; a microprocessor; or a wireless communication device.

Example 28: A device for retrieving media data, the device comprising: means for receiving a texture element of a GL Transmission Format 2.0 (glTF2) bitstream referencing a video object; and means for accessing the video object using data of the texture element.

Example 29: A computer-readable storage medium having stored thereon instructions that, when executed, cause a processor to perform the method of any of examples 1-24.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for accessing media data, the device comprising:
   a memory configured to store media data; and
   one or more processors implemented in circuitry and configured to:
      receive a scene description of a GL Transmission Format 2.0 (glTF2) bitstream including data defining positions of objects in a presentation environment, the scene description including data for a timed media object, the data for the timed media object including an accessor element that allows for rotating through a set of timestamped texture elements for the timed media object;
      determine a position of the timed media object in the presentation environment using the scene description;
      retrieve, using the accessor element, current timed media data for the timed media object for a current presentation time; and
      present the current timed media data according to the position of the timed media object at the current presentation time.

2. The device of claim 1, wherein the timed media object comprises a video object, and wherein the one or more processors are further configured to store texture frames of the video object to a circular buffer.

3. The device of claim 2, wherein each of the texture frames is associated with a bufferView element.

4. The device of claim 2, wherein each of the texture frames starts with a corresponding 2D vector of unsigned integer values including a 32-bit timestamp that corresponds to a presentation timestamp of the texture frame and a picture number value of the texture frame.

5. The device of claim 2, wherein the one or more processors are further configured to:
   maintain a read pointer into the circular buffer and a write pointer into the circular buffer; and
   prevent the read pointer from passing the write pointer.

6. The device of claim 1, wherein the scene description includes data indicating that the timed media object is stored on a remote device, and wherein the one or more processors are configured to retrieve the current timed media data from the remote device.

7. The device of claim 6, wherein the data of the scene description defines a uniform resource locator (URL) of the timed media object and corresponding to the remote device.

8. The device of claim 1, wherein the scene description includes data indicating that the timed media object is stored locally, and wherein the one or more processors are configured to retrieve the current timed media data from the memory.

9. The device of claim 8, wherein the scene description includes data defining a uniform resource locator (URL) of the timed media object and corresponding to a localhost address of the device.

10. The device of claim 1, wherein the timed media object comprises a video object, and wherein the one or more processors are configured to:
decode encoded video data of the video object to produce decoded YUV data;
convert the decoded YUV data to a texture format supported by a local graphics processing unit (GPU); and
make the texture formatted data available through a bufferView element with synchronization information.

11. The device of claim 1, wherein the one or more processors are further configured to process an MPEG_texture_video extension to glTF2 in an extensionsUsed element and an extensionsRequired element.

12. The device of claim 1, wherein the one or more processors are further configured to determine a URL of the timed media object, a MIME type of the timed media object, and time access and mapping information of the timed media object.

13. The device of claim 1, wherein the one or more processors are configured to access the timed media object from at least one of a video source indicated by a video MIME type and encapsulated into a timed track, a multiplexed source containing a video track and an audio track, a DASH media presentation indicated by a URL, or a DASH media presentation with multiple media types.

14. The device of claim 1, wherein the one or more processors are configured to access the timed media object using an HTTP GET request specifying a URL, and to append at least one of an autoplay attribute, a poster attribute, a controls* attribute, a loop attribute, or a muted attribute to the URL in the HTTP GET request.

15. The device of claim 1, wherein the timed media object comprises an audio object, and wherein the one or more processors are further configured to convert data of the audio object to an audio encoder input format.

16. The device of claim 15, wherein the one or more processors are further configured to process an Acoustic-Material element in the audio encoder input format.

17. The device of claim 15, wherein the one or more processors are further configured to determine audio sources corresponding to child attribute nodes of mesh primitives.

18. The device of claim 15, wherein the one or more processors are further configured to access encoded audio data of the audio object.

19. The device of claim 1, wherein the one or more processors are further configured to update a glTF2 scene description for the glTF2 bitstream using active processing.

20. The device of claim 19, wherein the one or more processors are further configured to update a description object model in an asynchronous manner.

21. The device of claim 1, wherein the one or more processors are further configured to update a description object model in a synchronous manner with a media source.

22. A non-transitory computer-readable storage medium having stored thereon instructions that, when executed, cause a processor to:
receive a scene description of a GL Transmission Format 2.0 (glTF2) bitstream including data defining positions of objects in a presentation environment, the scene description including data for a timed media object, the data for the timed media object including an accessor element that allows for rotating through a set of timestamped texture elements for the timed media object;
determine a position of the timed media object in the presentation environment using the scene description;
retrieve, using the accessor element, current timed media data for the timed media object for a current presentation time; and
present the current timed media data according to the position of the timed media object at the current presentation time.

23. The non-transitory computer-readable storage medium of claim 22, wherein the timed media object comprises a video object, the non-transitory computer-readable storage medium further comprising instructions that cause the processor to store texture frames of the video object to a circular buffer.

24. The non-transitory computer-readable storage medium of claim 23, wherein each of the texture frames is associated with a bufferView element.

25. The non-transitory computer-readable storage medium of claim 23, wherein each of the texture frames starts with a corresponding 2D vector of unsigned integer values including a 32-bit timestamp that corresponds to a presentation timestamp of the texture frame and a picture number value of the texture frame.

26. The non-transitory computer-readable storage medium of claim 23, further comprising instructions that cause the processor to:
maintain a read pointer into the circular buffer and a write pointer into the circular buffer; and
prevent the read pointer from passing the write pointer.

27. The non-transitory computer-readable storage medium of claim 22, wherein the timed media object comprises a video object, the non-transitory computer-readable storage medium further comprising instructions that cause the processor to:
decode encoded video data of the video object to produce decoded YUV data;
convert the decoded YUV data to a texture format supported by a local graphics processing unit (GPU); and
make the texture formatted data available through a bufferView element with synchronization information.

28. The non-transitory computer-readable storage medium of claim 22, further comprising instructions that cause the processor to convert data of the glTF2 bitstream to an audio encoder input format.

29. The non-transitory computer-readable storage medium of claim 22, further comprising instructions that cause the processor to update a glTF2 scene description for the glTF2 bitstream using active processing.

30. A device for accessing media data, the device comprising:
means for receiving a scene description of a GL Transmission Format 2.0 (glTF2) bitstream including data defining positions of objects in a presentation environment, the scene description including data for a timed media object, the data for the timed media object including an accessor element that allows for rotating through a set of timestamped texture elements for the timed media object;
means for determining a position of the timed media object in a presentation environment using the scene description;

means for retrieving, using the accessor element, current timed media data for the timed media object for a current presentation time; and means for presenting the current timed media data according to the position of the timed media object at the current presentation time.

\* \* \* \* \*